Dec. 22, 1970  A. JULES  3,549,982
DEVICE FOR PRODUCING ELECTRIC ENERGY IMPULSES
HAVING A SHORT DURATION AND A VERY HIGH
PEAK POWER WITH A DISRUPTIVE LOAD
Filed March 28, 1968  2 Sheets-Sheet 1
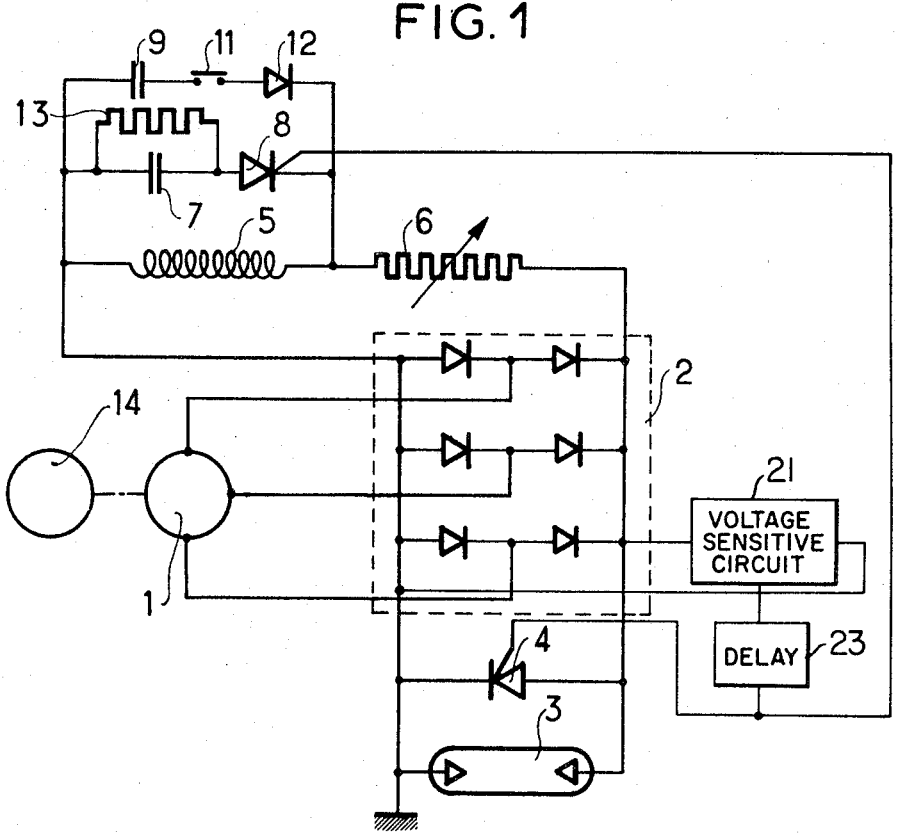
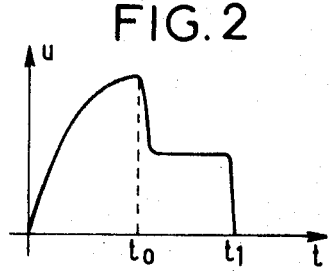
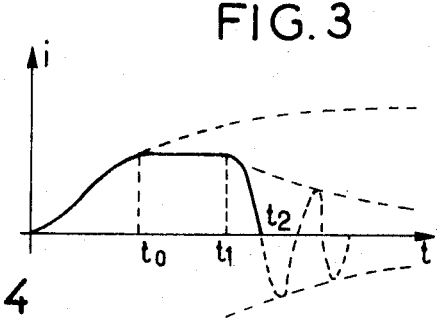
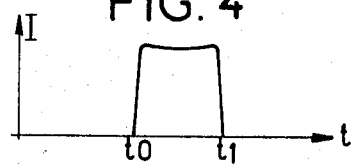

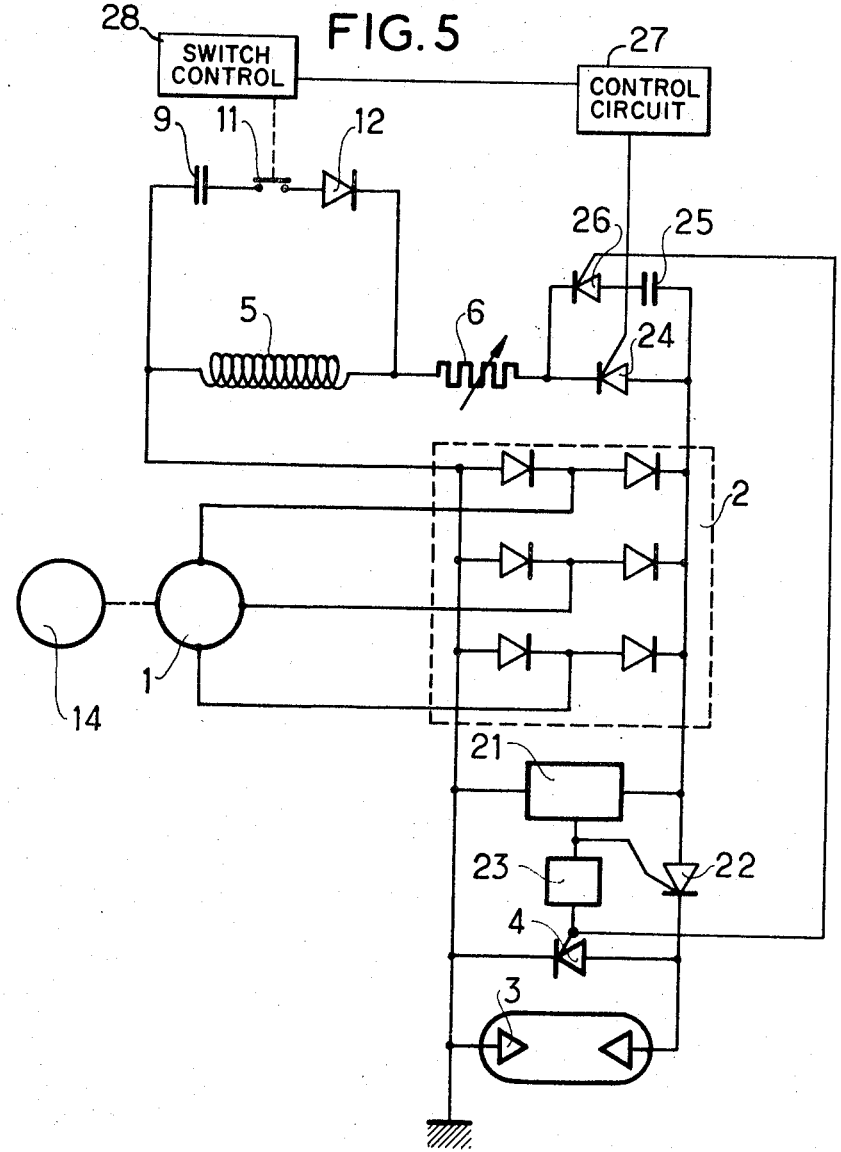

United States Patent Office 3,549,982
Patented Dec. 22, 1970

3,549,982
DEVICE FOR PRODUCING ELECTRIC ENERGY IMPULSES HAVING A SHORT DURATION AND A VERY HIGH PEAK POWER WITH A DISRUPTIVE LOAD
Andre Jules, Sartrouville, France, assignor to Compagnie Generale d'Electricite, Paris, France, a French corporation
Filed Mar. 28, 1968, Ser. No. 716,913
Claims priority, application France, Mar. 31, 1967, 101,125
Int. Cl. H02p 9/30
U.S. Cl. 322—28                                  18 Claims

ABSTRACT OF THE DISCLOSURE

Device for producing electric energy pulses having a short duration and a very high peak power for a disruptive load, comprising an alternator feeding a rectifier bridge to the output of which the load is connected, a rectifier having a controlled conduction being disposed across the terminals of the load.

---

The present invention relates to the devices designed for producing electric energy impulses having a short duration and a very high peak power for a disruptive load. These devices are used particularly for the supply of energy to electronic flash lamps serving for the pumping of lasers.

The supply of energy to electronic laser flash lamps is presently effected by means of batteries of condensers which are abruptly discharged into the flash lamp. These devices based on the use of condensers have several drawbacks. First of all, according to the present state of the art, it is impossible to obtain a rate or flash frequency greater than 2 flashes per second since the time for recharging the condensers is rather long.

Moreover it is known that, when a laser operates in the relaxed condition, its output level is rather low at the end of the impulse. Now, the batteries of condensers also furnish pulses having a decreasing level at the end thereof, that is to say, the current which is supplied is weaker at the end of the pulse. This characteristic of the pulses furnished by the condensers further reduces the output of the laser at the end of the pulse.

The condenser discharge devices have another significant drawback. Specifically, their overall dimension or space occupied thereby, both from the points of view of weight and volume, becomes prohibitive for arrangements providing high peak powers.

There are known in the art—particularly from the French Pat. No. 806,555 and the patent of addition thereto No. 50,835, as well as from the British Pat. Nos. 432,041 and 530,450—devices which comprise a high frequency alternator producing extremely dense energy pulses of brief duration for the purpose of soldering. These known devices, however, are not suitable for furnishing pulses having a very brief duration and a very high peak power as necessary for exciting a laser. Furthermore, the pulses which they supply have a random form or configuration, a fact that is not disadvantageous for soldering operations but is inadmissible for use with lasers.

The present invention is directed to and concerned with a device for producing electric energy pulses having a short duration and a very high peak power for use with a disruptive load, with the aid of which it is possible to obtain pulses at a high rate whose energy density remains constant during the course of the pulse and whose overall physical dimension relative to volume and weight is markedly reduced as compared to the known condenser devices.

The device proposed by the present invention is characterized in that it comprises a high frequency alternator having either a large inertia or being coupled to an inertia fly-wheel, a rectifier bridge connected between the output of this alternator and the load, and a controlled rectifier which is disposed in parallel with the load and whose cathode is connected to the negative terminal of the rectifier bridge.

According to one feature of the present invention, the alternator provides a compound excitation, which renders it possible to obtain a pulse having an ascending wave form, that is to say, whose instantaneous energy density is higher at the end than at the start of the pulse.

According to another feature of the present invention, the alternator is self-excited.

According to yet another feature of the present invention, the alternator is energized by the discharge of a condenser within the inductor winding.

The present invention will be further described hereinbelow with reference to the accompanying drawings, wherein FIG. 1 illustrates schematically a device as proposed by the present invention;

FIGS. 2, 3 and 4 show diagrams explaining the operation of the device shown in FIG. 1, and FIG. 5 is a schematic illustration of a modified embodiment according to the present invention.

The device illustrated in FIG. 1 essentially comprises an alternator 1 which is driven by a driving motor 14 and whose stator windings are connected to a rectifier bridge 2. A disruptive load consisting of an electronic flash lamp 3 is connected at the output terminals of the rectifier bridge 2. A rectifier element 4 having a controlled conduction is disposed in parallel with the flash lamp 3 with the anode thereof connected to the positive terminal of the rectifier bridge. This rectifier element may consist of a thyratron or of an ignitron. Controlled rectifier 4 is rendered conductive through its control electrode by a circuit which delivers control signals at the appropriate time ($t_1$ as shown in FIGS. 2–4) as discussed below.

According to a particularly advantageous embodiment of the present invention, the alternator is self-excited, and the exciting winding 5 thereof is energized, for example, by means of the rectifier bridge 2, as illustrated in FIG. 1, or by means of an auxiliary rectifier bridge connected directly to the stator windings of alternator 1. The exciting current for winding 5 is regulated by means of a variable resistor 6 disposed in series with the winding. In the case where the exciting voltage is obtained by means of a bridge of auxiliary rectifiers, the regulation may be obtained with the aid of an auto-transformer.

Connected in parallel with the exciting winding 5 is a first circuit which comprises in series a condenser 7 and a rectifier element 8, such as a thyratron for example, whose cathode is connected to the positive pole of the winding 5. The control electrode of the control rectifier 8 is connected to a control circuit, as is controlled rectifier 4, the control circuit sending control signals at the appropriate time $t_1$ (as shown in FIGS. 2–4) as will be explained below. A second circuit which comprises in series a condenser 9, a switch or circuit breaker 11 and a rectifier element 12, whose cathode is connected to the positive terminal of the winding 5, is also positioned in parallel on the exciting winding 5.

As previously stated, controlled rectifiers 4 and 8 have their control electrodes connected to a control circuit. This control circuit is a voltage sensitive circuit 21 connected across the terminals of diode bridge 2. The output of circuit 21 is coupled to the control electrodes of control rectifiers 4 and 8 through a conventional delay circuit 23 which delivers the actuating signal delivered by control circuit 21 at $t_0$, as shown in FIGS. 2-4, after a set delay time ($t_1-t_0$), as will be discussed below.

The operation of the device which will be described hereinafter is explained with the aid of the diagrams shown in FIGS. 2, 3 and 4 which represent respectively, as a function of the time $t$, the voltage U at the output terminals of the rectifier bridge 2, the exciting current $i$ of the alternator, and the current I flowing through the flash lamp 3.

The energization of the alternator is accomplished by closing, at the time $o$, the circuit breaker 11, which has the effect of discharging the condenser 9—which has previously been charged by means of an exterior current source (not shown)—into the exciting winding 5. The voltage U and the exciting current $i$ increase in an exponential manner up to the moment $t_0$ when the exciting current $i$ from the alternator reaches the regulation value which hase been determined as necessary for obtaining the required charge voltage at the terminals of the flash lamp 3. At that moment $t_0$ to the flash is energized and the voltage U then passes from its no-load value to the value thereof under charge, while the exciting current $i$ retains a constant value. At the same moment $t_0$, circuit 21, sensitive to the above determined voltage, delivers a signal to delay circuit 23.

At the moment $t_1$ the rectifier element 4 having a controlled conduction receives the signal, generated by circuit 21 and delayed by delay 23 until time $t_1$, and is energized. This has the effect of short-circuiting the flash lamp 3, the intensity of current I being reduced to zero very rapidly as a result thereof. The voltage at the terminals of the rectifier bridge 2 becomes practically zero, just as is true for the exciting current $i$.

At the same moment $t_1$ the rectifier control signal delayed by element 23 is received by rectifier element 8 which is then energized. Since rectifier is now conductive, the exciting winding 5 discharges into the condenser 7. By reason of the presence of the condenser 7 which forms an oscillatory circuit with winding 5, the current $i$ decreases according to a damped sinusoidal curve and is extinguished at the instant $t_2$ of the first passage thereof to 0 because of the presence of the controlled rectifier 8 which ceases to conduct when the current becomes negative. This provision makes it possible to obtain a very rapid de-energization of the alternator, and particularly to reduce the losses in the armature circuit. At the instant $t_2$, the alternator is ready to effect a new cycle, resistor 13 has provided a discharge path for the condenser 7.

It would be possible to utilize also a single condenser at the same time for purposes of the energization of the alternator and the de-energization thereof, for example by dispensing with the condenser 9 and by placing the unit consisting of the circuit breaker 11 and of the rectifier 12 in parallel with the controlled rectifier 8.

The alternator operates in a pulse system; it must furnish pulses whose peak power is very high for the case where the use thereof is in the pumping of lasers. The form or configuration of the pulses must be as square as possible, as has been illustrated in FIG. 4, and the rate thereof can be high. As a consequence, it is particularly advantageous to employ an alternator having special characteristics with respect to the particular use intended therefor.

In other words, it is important that this alternator have a very great inertia so as to be adapted to be driven by a motor whose power corresponds to the mean power of the pulses, and not to the peak power thereof. Additionally, it is necessary that its time constant be rather low so as to obtain square pulses even if the duration thereof is short. For the purpose of obtaining high peak powers, it is equally desirable that the alternator have very low magnetic leakage losses, as well as very low induced current reaction and reactance.

Applicant will now describe one example of an alternator for use in connection with the present invention, which has been calculated for an arrangement capable of supplying pulses of 3,600 joules in one millisecond at a maximum rate of seven pulses per second, or pulses of 25,000 joules lasting forty milliseconds at the rate of one pulse per second. In both of these cases, the mean power is approximately 25 kw., a power which will thus be chosen for the driving motor, and the latter may be either a thermal or an electric motor, as the case may be. The highest peak power is obtained in the first case, where the power is 3,600 kw., and the alternator has been proportioned for this power.

The speed must be the highest possible, yet it must remain compatible with the centrifugal forces; furthermore, the choice of a very high speed of rotation for the alternator requires the use of a mechanical multiplier interposed between the alternator and the driving motor, which would increase the cost and offset the weight advantage obtained by use of the lighter motor. In consideration of all of these different points, applicant has selected a speed of 3,000 $t/mn$ for the alternator.

The choice of a large number of poles renders it possible to provide an alternator which is still lighter; additionally this renders it possible to reduce the time constants and to achieve the result that the ampere turns of the induced current reaction are about equal to the magnetizing ampere turns in such a manner as to reduce the induced current reaction. In the embodiment under discussion, applicant has chosen a number of poles equal to 48, or a frequency of 1,200 Hz.

In order to reduce the magnetic flux leakages to a maximum extent, the height or level of the poles of the alternator is reduced to the minimum possible compatible with the reduction of the losses. The pole arrangement thus has the appearance of an annular crown with slightly projecting poles. Applicant has selected a height of the polar cores equal to 6 millimeters and a height of the pole pieces of 2.5 millimeters for an armature diameter of 600. Likewise, the depth of the stator notches is low and equal to 13 millimeters.

Additionally, in order to obtain optimum power, it is particularly advantageous that the internal reactance of the alternator be approximately equal to the resistance of the flash lamp reduced per phase, that is to say, if R is the resistance of the flash lamp, it is desirable that the internal reactance X have an absolute value in the neighborhood of 0.55 R. In view of the fact that, in the two aforementioned cases of operation, the resistance of the flash lamp is respectively 4 and 7.2 ohms, applicant has proportioned the alternator in a manner so as to obtain a reactance of 2.75 ohms, which corresponds to a flash lamp resistance reduced per phase of 5 ohms.

With the aid of the device proposed by the present invention it is possible to obtain a pulse having a constant energy density, in other words, the shape of the pulse is rectangular (see FIG. 4). The output of a laser operating in the relaxed condition is thereby improved. This output may be still further improved by using an alternator having compound excitaiton, which allows for obtaining a pulse having the configuration of a rectangular trapezoid whose large base corresponds to the end of the pulse. In effect, the exciting energy is in the case greater at the end of the pulse and the output of the laser is thereby greatly improved.

The use of self-exciting alternator makes it possible that a rapid de-energization is obtained even in the case of compound excitation, since the compound rate will be rather low.

The recharging of the device described hereinabove is accomplished smoothly in a regular manner, and it is thereby possible to obtain a short recharging time, and therewith an elevated rate or frequency of operation. As a matter of fact, in the example described above, the speed of the unit decreases only by 10% at the time of the pulse and then returns progressively and rapidly to its normal value.

In order to indicate the general reduction by weight and by volume obtained with the present invention, a comparative study has been made between a conventional electronic flash energization or supply device comprising batteries of condenser, and a device as proposed by the present invention. At 15,000 t/mn for a pulse energy of 1kj., the advantage obtained by using rotary machines according to the present invention is 11% by weight and 57% by volume, and for energies of 100 kj., the reductions by weight and by volume are respectively 54 and 78%. Accordingly, it is apparent that this advantage is very considerable for devices operating at high peak powers.

An additional feature by way of example is derived for devices requiring relatively lower peak powers through the construction of a portable device having a low weight (less than 10 kilograms) and small volume, which construction is inconceivable for condenser devices.

The presence of the controlled rectifier 4 makes it possible to obtain an end pulse having a steep front, which is important for the excitation of a laser.

FIG. 5 illustrates another embodiment of the present invention. This figure provides a circuit which contains many of the same elements shown in FIG. 1, which elements are designated by the same reference numerals. A voltage sensitive device 21 is disposed across the terminals of the rectifier bridge 2; it controls the release or triggering of an element 22 having a controlled conduction and being disposed in series with the load 3. The output signal of the voltage sensitive device 21 is also applied to a delay line 23 whose output serves to actuate the controlled rectifier 4. The presence of the controlled rectifier 22 makes it possible to avoid premature self-energization of the flash lamp 3. In effect, the characteristics of the lamp vary with time, and the level of energization voltage which fires the lamp tends to decrease because of the aging of the flash lamp.

The operation of the system of FIG. 5 is as follows. When the alternator is energized, the voltage U increases and reaches the threshold value of the device 21 which then delivers a releasing signal to the controlled rectifier 22, which in turn triggers the flash lamp 3. The output signal of the device 21 also controls the controlled rectifier 4 by means of the delay line 23 whose delay determines precisely the duration of the pulse.

Furthermore, a rectifier 24 having a controlled conduction is disposed in series in the exciting circuit including the winding 5 and variable resistor 6. Disposed in parallel with the rectifier 24 are a condenser 25 and another controlled rectifier 26. The rectifier 24 is rendered conductive at the beginning of the cycle, that is to say, it is excited when the circuit breaker 11 is closed through switch control 28 via control circuit 27, and it makes it possible to obtain a counter-blocking of the exciting current. This counter-blocking is achieved by the excitation of the rectifier 26, which produces the extinction of the rectifier 24 by means of the inverse current due to the discharge of the condenser 25. This provision has the effect of increasing the speed of de-energization of the alternator. The rectifier 26 may be controlled at the same time as the rectifier 4. In this embodiment of the present invention, it is also possible to utilize the condenser 7 and the diode 8 for discharging the energy remaining in the exciting winding 5.

I have shown and described several embodiments in accordance with the present invention. It is understood that the same is not limited thereto but is susceptible of numerous changes and modifications as known to a person skilled in the art and I, therefore, do not wish to be limited to the details shown and described herein, but intend to cover all such changes and modifications as are encompassed by the scope of the appended claims.

I claim:
1. Apparatus for producing short duration electrical energy pulses having high peak power comprising:
   an alternator having a field winding;
   rectifying means coupled to the outputs of said alternator for producing a rectified high energy signal; and
   energy sensitive means responsive to said high energy signal for terminating said high energy signal and for de-energizing said field winding a predetermined time after said high energy signal reaches a desired level.
2. Apparatus according to claim 1, wherein said energy sensitive means comprises means for sensing the magnitude of the high energy signal and for producing a control signal upon detection of said desired level.
3. Apparatus according to claim 2, wherein said energy responsive means includes a circuit for delaying said control signal said predetermined time.
4. Apparatus according to claim 3, wherein said energy sensitive means further includes a controlled rectifier coupled to said recitfying means for terminating said high energy signal in response to said delayed control signal.
5. Apparatus according to claim 3, wherein said energy sensitive means further includes a controlled rectifier coupled to said field winding for de-energizing said field winding in response to said delayed control signal.
6. Apparatus according to claim 5, further including a resistor-capacitor network coupled between said field winding and said controlled rectifier for absorbing the energy from the field as it is de-energized.
7. Apparatus according to claim 3, further including a first controlled rectifier coupled to said rectifying means for terminating said high energy pulse in response to said delayed control signal, and a second controlled rectifier coupled to said field winding for de-energizing said field winding in response to said delayed control signal.
8. Apparatus for producing light pulses of high peak power and short duration for use in supplying pumping energy to a laser comprising
   an alternator having a field winding;
   rectifying means responsive to the output of said alternator for producing a rectified high energy signal;
   energy sensitive means responsive to said high energy signal for terminating said high energy signal and for de-energizing said field winding a predetermined time after said energy signal reaches a desired level; and
   means responsive to said energy sensitive means and said rectifying means for optically pumping a laser with a pulse of high optical energy and having a duration substantially equal to said predetermined time.
9. Apparatus according to claim 8, wherein said optically pumping means comprises a flash lamp.
10. Apparatus according to claim 8, wherein said energy sensitive means comprises means for sensing the magnitude of the high energy signal and for producing a control signal upon detection of said desired level.
11. Apparatus according to claim 10, wherein said energy responsive means includes a circuit for delaying said control signal said predetermined time.
12. Apparatus according to claim 11, wherein said energy sensitive means further includes a controlled rectifier coupled to said rectifying means for terminating said high energy signal in response to said delayed control signal.
13. Apparatus according to claim 10, further including means responsive to said control signal for preventing the pumping means from pumping said laser prior to the receipt of said control signal.
14. Apparatus according to claim 13, wherein said preventing means includes a controlled rectifier coupled between said pumping means and said rectifying means for preventing the pumping of said laser until said con- trol signal from said sensing means is delivered to its control electrode.

15. Apparatus according to claim 11, wherein said energy sensitive means further includes a controlled rectifier coupled to said field winding for de-energizing said field winding in response to said delay signal.

16. Apparatus according to claim 15, wherein said controlled rectifier is coupled to said field winding to a variable resistor and is controlled by said delayed control signal.

17. Apparatus according to claim 11, further including a first controlled rectifier coupled to said rectifying means for terminating said high energy signal in response to said delayed control signal, and a second controlled rectifier coupled to said field winding for de-energizing said field winding in response to said delayed control signal.

18. Apparatus according to claim 17, wherein said second controlled rectifier is coupled to said field winding to a variable resistor and is controlled by said delayed control signal.

References Cited
UNITED STATES PATENTS

| | | | |
|---|---|---|---|
| 2,752,554 | 6/1956 | Abell | 322—86X |
| 2,911,584 | 11/1959 | Kall | 322—86X |
| 3,209,236 | 9/1965 | Bridgeman | 322—28 |
| 3,260,917 | 7/1966 | Shimwell et al. | 320—39X |
| 3,314,001 | 4/1967 | Brockman | 322—68X |
| 3,317,765 | 5/1967 | Cone | 322—4X |
| 3,332,004 | 7/1967 | Shano | 322—94X |
| 3,405,347 | 10/1968 | Swift et al. | 322—91 |

ORIS L. RADER, Primary Examiner

H. HUBERFELD, Assistant Examiner

U.S. Cl. X.R.

322—68, 91, 94